Dec. 23, 1958     H. U. LAHDE     2,865,443
PORTABLE COOKING STOVE
Filed Sept. 5, 1950     5 Sheets-Sheet 1

INVENTOR.
HERMAN U. LAHDE.
BY Robert H. Jacob

Dec. 23, 1958     H. U. LAHDE     2,865,443
PORTABLE COOKING STOVE

Filed Sept. 5, 1950     5 Sheets-Sheet 2

INVENTOR.
HERMAN U. LAHDE.

BY Robert H. Jacob

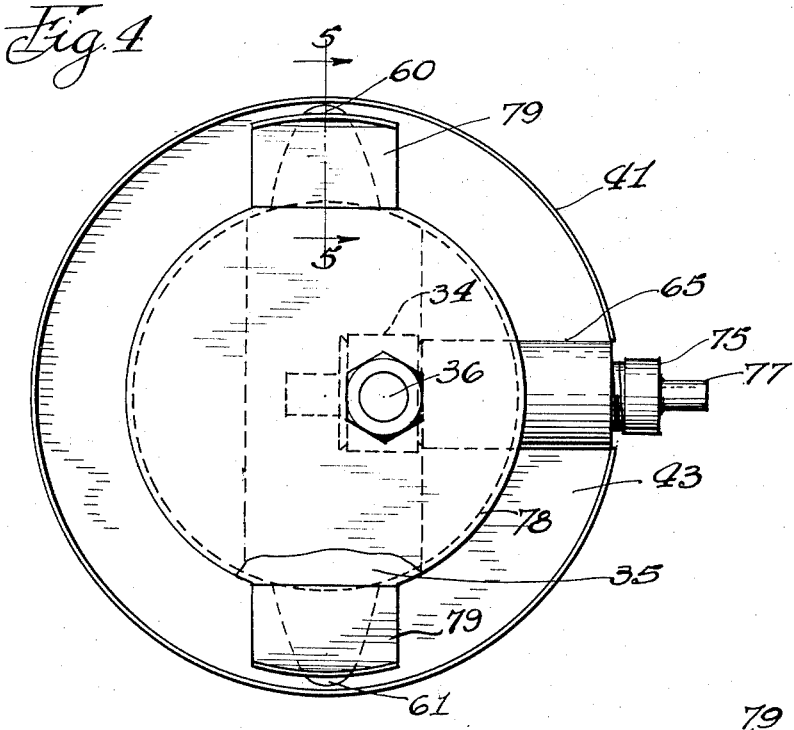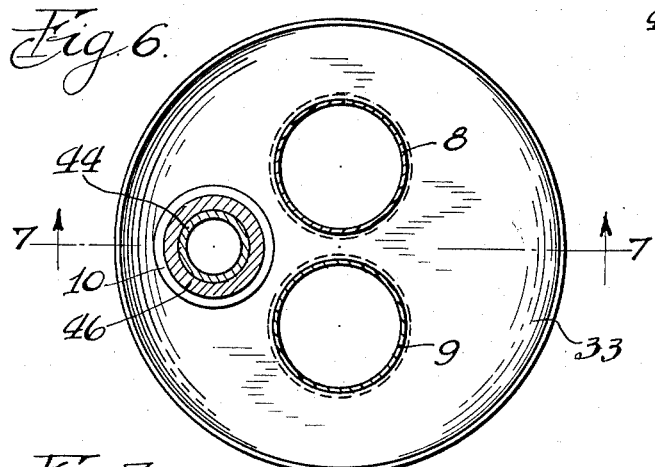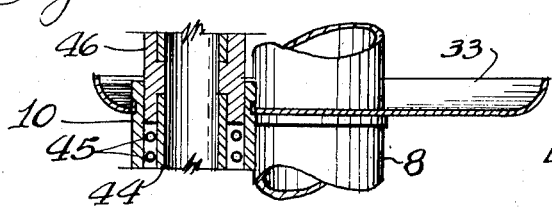

Dec. 23, 1958  H. U. LAHDE  2,865,443
PORTABLE COOKING STOVE
Filed Sept. 5, 1950  5 Sheets-Sheet 4
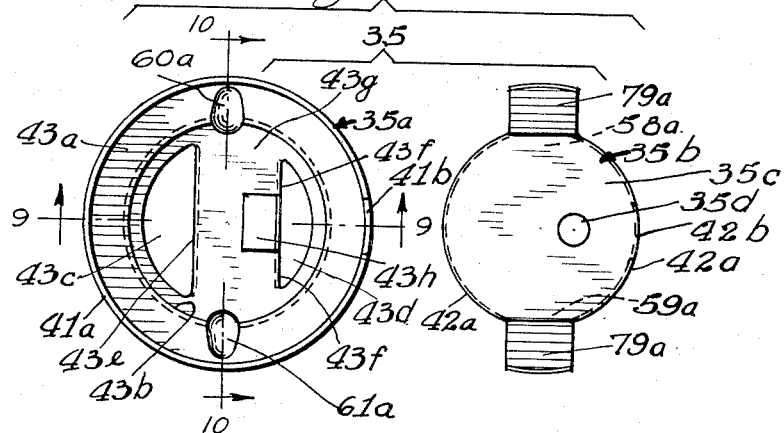
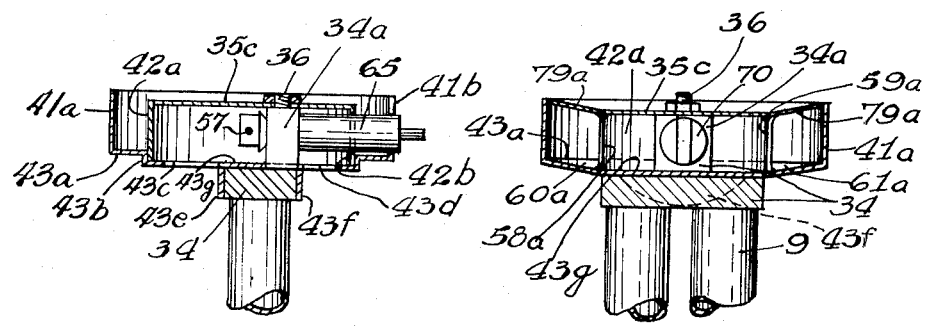
INVENTOR.
HERMAN U. LAHDE
BY Robert H. Jacob

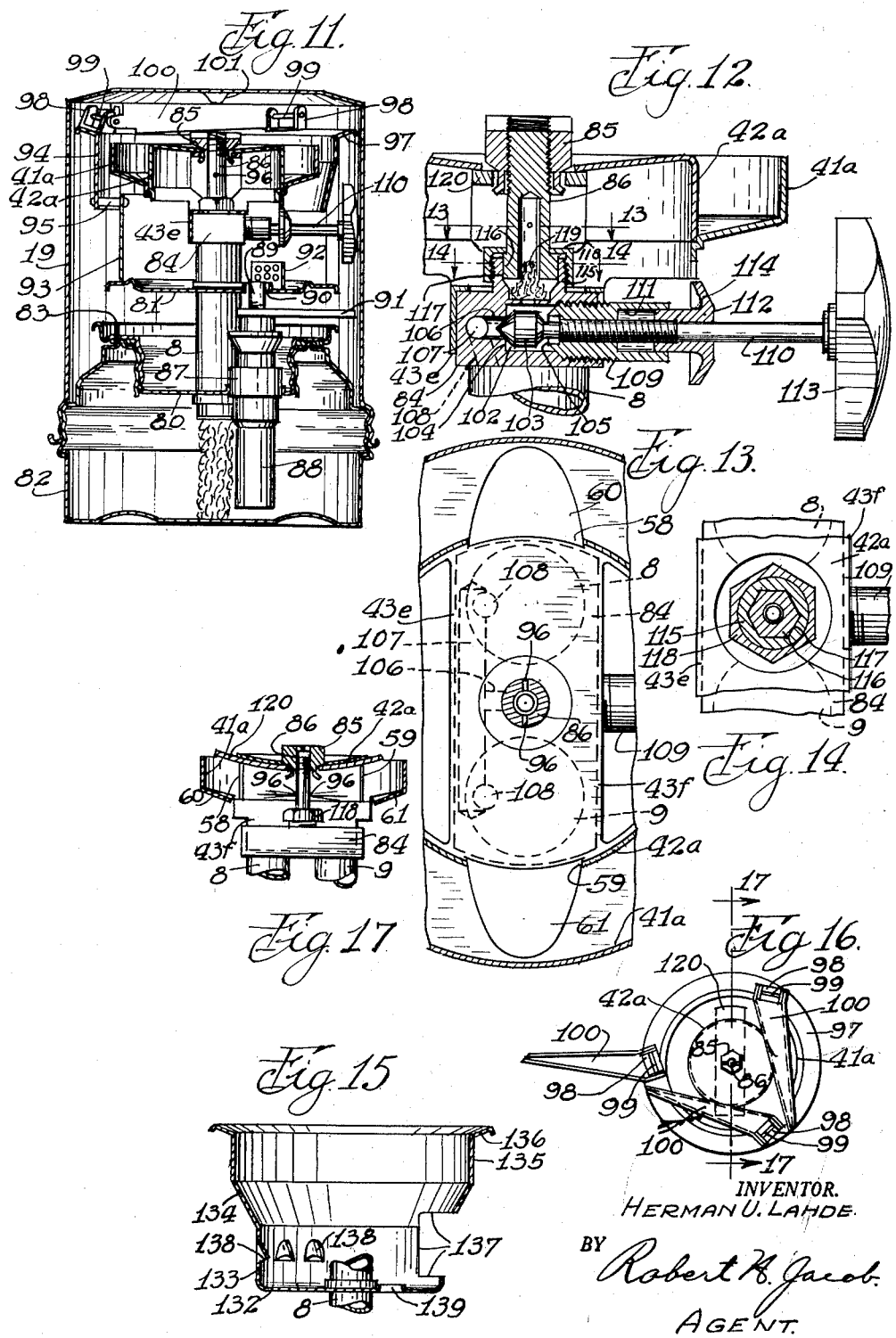

United States Patent Office 2,865,443
Patented Dec. 23, 1958

2,865,443

PORTABLE COOKING STOVE

Herman Ubbo Lahde, Nashville, Tenn., assignor to Aladdin Industries, Incorporated, Nashville, Tenn., a corporation of Illinois Application September 5, 1950, Serial No. 183,173

2 Claims. (Cl. 158—72)

The present application is a continuing application of my application Ser. No. 122,689 filed Oct. 21, 1949 as to the disclosure of Figs. 1 to 10 inclusive, the specification descriptive thereof, and as to the claims filed in said earlier application, and is an original application as to any subject matter illustrated by and based on Figs. 11 to 17 inclusive that differs patentably from the disclosure of said earlier application.

The invention pertains to portable gasoline stoves of small size and weight, adapted to be a part of the equipment of hunters, sportsmen, soldiers and the like, particularly where the stoves are for use in very hot and very cold climates. Stoves of small size of the kind referred to, that operate satisfactorily in temperate climates, are found to be entirely unsuited and inoperative where the temperatures are low, for example, 65 degrees below zero, Fahrenheit, because of radiation and conduction of heat from the burners being so great that insufficient heat remains to maintain the vaporizing of the fuel. At the same time, stoves intended to be parts of regular service kits for soldiers and the like, must be so small and of such light weight, that less portable structures adapted to function at very low temperatures, are entirely impracticable because of their excessive weight and size.

It is an object of the invention to produce a gasoline stove well within the limits as to weight and size permitted for soldiers' kits, in which the burner is practically heat isolated from the other parts of the structure, so that heat losses by conduction and radiation are so low, that the operation of the burner is not interfered with. This is accomplished by making the metal parts supporting the valve and burner, of material that is highly heat resistant, and that has low heat conductivity.

It is a further object of the invention, to make the valve and burner of such small size that their heat radiating areas are reduced to the minimum compatible with efficiently burning the fuel.

It is a further object of the invention to concentrate in the burner and adjacent valve structure a substantial mass of metal having high heat conductivity and retentivity, to the end that sufficient heat may always be present at the burner during its operation, to insure its successful functioning.

It is a further object of the invention to so closely associate the necessary vaporizing and mixing chambers with the burner, that connecting parts are eliminated, and heat losses are correspondingly reduced.

It is a further object of the invention, to supply the vaporizing chambers with fuel entirely by the capillary action of special wicking, and entirely without the application of heat and pressure to the tank containing the fuel.

It is a further object of the invention to reduce heat radiation and conduction from the burner to the tank containing the fuel, to permit safe operation under extremely hot temperatures.

It is a further object of the invention to prevent appreciable loss of pressure in the vaporizing chamber by back flow into the tank, entirely by the manner of assembling special wick material in the generator tubes of the stove, and without the use of valve mechanism of any kind.

It is a further object of the invention to limit the vaporizing chambers to small lengths and volumes of the ends of the generator tubes that are included in the mass of heat-storing metal of the valve structure, and to deliver the fuel vapor from the vaporizing chamber through the valve structure to its delivery orifices by short passageways entirely contained within said mass of heat-storing metal, and without the use of additional tubing of any kind.

It is a further object of the invention to locate the fuel delivery orifices and mixing chamber within the confines of the burner, and to employ walls of the burner as confining walls of the mixing chamber.

The above and other objects of the invention will more fully appear by reference to the accompanying drawings illustrating a preferred embodiment thereof, in which Fig. 1 is a vertical, central, sectional view through the stove with the removable casing in place thereon to enclose the parts, this view being taken along the line 1—1 in Fig. 3;

Fig. 4 is a plan view of the burner and valve structure shown in Fig. 3;

Fig. 5 is a sectional view of part of the structure shown in Fig. 4, taken along the line 5—5 in the latter figure;

Fig. 6 is a horizontal, sectional view to an enlarged scale of part of the structure shown in Fig. 2 taken along the line 6—6 in the latter figure;

Fig. 7 is a vertical, sectional view of the torch shown in Fig. 6, taken along the line 7—7 in the latter figure;

Fig. 8 is a detailed plan view of the disassembled parts of a preferred burner construction.

Figs. 9 and 10 are central, sectional views taken respectively along the lines 9—9 and 10—10 in Fig. 8 and show the burner parts of Fig. 8 in assembled condition.

Figure 2:
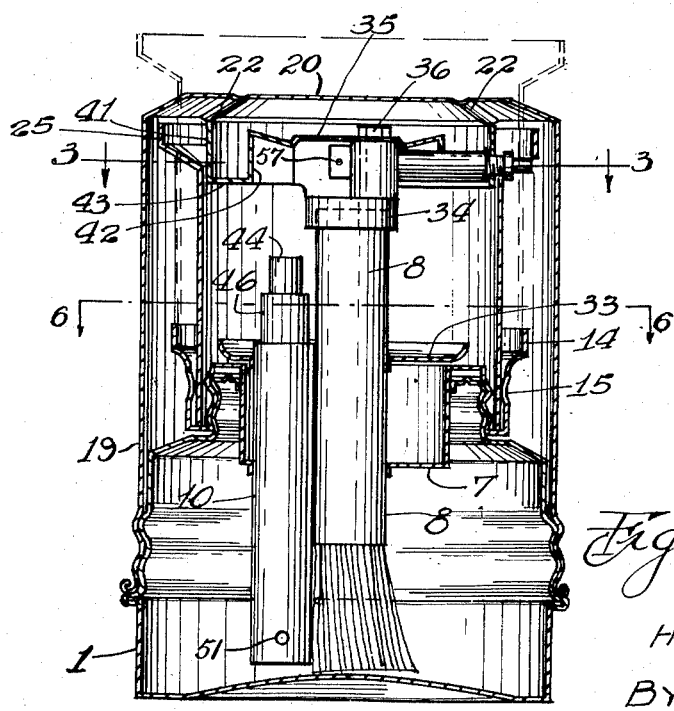
Fig. 2 is a view similar to Fig. 1, taken along the line 2—2 in Fig. 3.

Fig. 11 shows in a view similar to Fig. 2 a modified form of the invention;

Fig. 12 is a vertical, central, sectional view to an enlarged scale of the control valve construction shown in Fig. 11;

Fig. 13 is a horizontal, sectional view of the structure shown in Fig. 12, taken along the line 13—13 in Fig. 12;

Fig. 14 is a horizontal sectional view of the structure shown in Fig. 12, taken along the line 14—14 in Fig. 12;

Fig. 15 shows in central vertical sectional view a modified form of the windshield structure shown in Fig. 11.

Fig. 16 is a plan view to a reduced scale, of the utensil supporting structure shown in Fig. 11; and Fig. 17 is a vertical, central, sectional view to an enlarged scale, of the burner structure shown in Fig. 16, taken along the line 17—17 in Fig. 16.

Similar numerals refer to similar parts throughout the several views.

Figure 1:
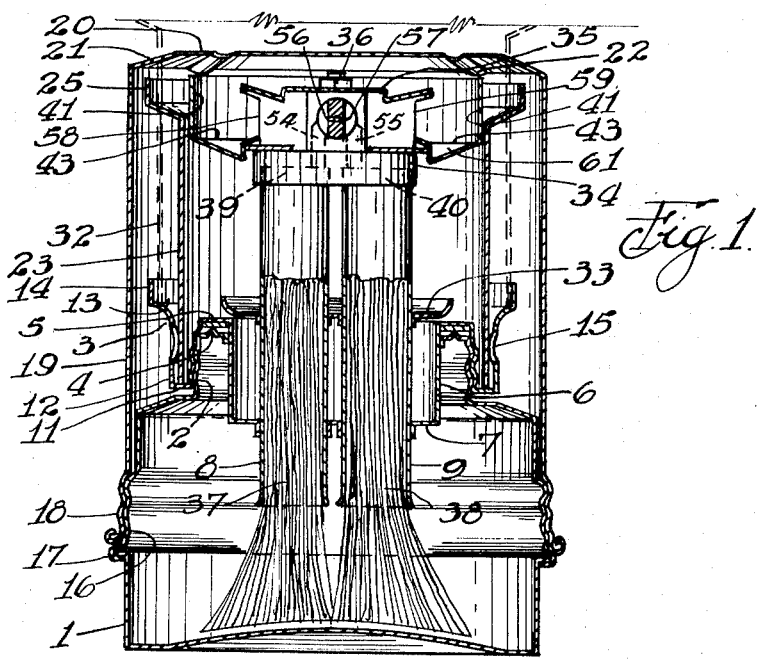

As shown in Figs. 1 and 2, the stove includes a fuel tank 1 of sheet metal having at its upper end a constricted central extension 2 which is threaded to engage a threaded tank cap 3, constituting a top wall element of the tank. At its upper end, said threaded extension 2 is provided with an annular rib 4 engaging a ring 5 of packing material to make a tight joint between the cap 3 and the tank 1. Below and inside of the ring 5, the cap is provided with a downwardly extending cylindrical portion 6 parallel with and spaced a small distance from the threaded portion of the cap, which portion 6 is integral at its lower end with the outer edge of a disk-like member 7 of the cap. The member 7 has extending through it two vertical metal generator tubes 8 and 9 (Fig. 1), and a vertical metal torch sleeve 10 (Fig. 2), which tubes and torch sleeve have the lateral relationship shown in Fig. 6, and are rigidly secured with tight joints to the member 7 in any desired manner, for example, by soldering, brazing or welding.

As shown in Fig. 1, the lower end of the threaded portion 3 of the tank cap is integral with a horizontal annular member 11 of small radial extent, and from the outer edge of said member 11 the cap continues integrally in a cylindrical and upwardly extending portion 12 spaced a small distance radially from the threaded portion 3 of the cap and integrally connected at its upper end somewhat higher than the packing material 5, with the inner edge of a horizontal annular portion 13 extending outwardly radially a short distance from the portion 12 and integrally connected at its outer edge with the lower end of a cylindrical flange 14 extending a short distance above the portion 13. The portion 12 is provided with a plurality of openings 15 to reduce heat conduction to the tank.

As shown in Fig. 1, the cylindrical outer surface of the tank 1 is provided about midway between its upper and lower ends, with screw threads 16, to facilitate which, the tank is made in two parts tightly seamed together at 17. The threads 16 are externally engaged by threads 18 on the lower end of a cylindrical sheet metal casing 19 having a diameter substantially equal to the diameter of the lower portion of the tank 1, and closed at its upper end by an annular, horizontal and integral portion 20 which is flat excepting that its outer edge portion 21 is beveled as indicated and provided with a plurality of spaced and formed ribs 22 extending into the casing 19 for a purpose below explained. The casing 19 has a height to enclose the entire upper structure of the stove with a small top clearance, when its threads 18 are in tight engagement with the tank threads 16.

As shown in Fig. 1, the stove is provided with a compressible tubular stand 23 which for the closed condition of the stove, rests at its lower end on the portion 11 of the tank cap 3, with its upper end below the upper end of the casing 19. The stand 23 is a straight tubular structure and open at its upper end, excepting that a short distance below its upper end, it is provided with integral supporting portions 24 extending outwardly and upwardly to in use support cooking utensils, and from the outer edges of the portions 24 the stand continues integrally into short vertical portions 25 constituting flanges to retain utensils on the portions 24.

The stand 23 is so made that in its expanded condition, the lower end of the stand will enter easily within the portion 14 of the tank cap 3 and be supported by the portion 13 thereof, and that the flanges 25 of the stand will have a diameter slightly larger than the diameter of the closed end portion of the casing 19. This permits the use of the casing 19 in inverted condition, as a cooking utensil on the stand as illustrated in Fig. 10. The casing 19 is made so that it will contain a can of army rations with a small clearance space entirely around the can. The arrangement illustrated in Fig. 10 facilitates thawing, heating and cooking the contents of such cans by means of water in the casing 19 entirely surrounding the can, the ribs 22 at that time preventing end contact of the can with the casing 19, and permitting water circulation entirely around the can.

As shown in Fig. 1, a catch pan 33 is supported by the generator tubes 8 and 9 in horizontal position about at the level of the portion 13 of the tank cap 3. The tubes 8 and 9 extend a substantial distance above the pan 33 and at their upper ends enter with a tight fit, bores therefor in a valve housing 34, the length of said bores being substantial, and said tubes being permanently secured to said valve housing in any well known manner to afford stable support to said housing. The housing 34 in turn supports on its upper surface, the generally circular top horizontal wall 35 of a burner, by means of a threaded stud 36 extending from said housing through the wall 35, and a nut on said stud above said wall, the upper surface of said nut being substantially in the plane of upper end of the cylindrical portion of the casing 19 when in place on the tank 1. The torch sleeve 10 and tubes 8 and 9 extend through the catch pan 33 in the relation shown in Fig. 6 and are rigidly secured to said catch pan, thereby affording stable support for the burner and valve housing.

As shown in Fig. 1, the tubes 8 and 9 extend below the cap portion 7 nearly half way to the bottom of the tank 1, and are filled with wicking 37 and 38 extending from a short distance below the upper ends of the tubes 8 and 9 through said tubes and a substantial distance from their lower ends, into the tank 1, to supply the small unfilled compartments 39 and 40 in said tubes, with fuel by capillary action, said compartments being the vaporizing compartments of the stove and subjected to high temperature by intimate association of the valve housing 34 with the burner.

The stove operates with practically atmospheric pressure in the tank and with the tank and its contents at atmospheric temperature, regardless of how cold that may be down to 65 degrees below zero Fahrenheit. The small size of the stove and of the fuel tank makes it undesirable to provide the tank with an air pump. The only possible conduction of pressure is through the wicking in the generator tubes, between the vaporizing chambers and the interior of the tank. No other connection for fluid flow exists with the interior of the tank.

The stove is only about three and one-quarter inches in diameter and about four and five-eighths inches high over the casing when the latter is in place on the tank, the parts of the stove being of corresponding size as shown in the drawings. This shows how necessary it is to avoid heat conduction from the burner and valve housing that can be avoided, to maintain said parts at the requisite temperatures to effect the continuous operation of the stove in the sub-zero temperatures referred to, also the necessity of reducing the transfer of heat from the burner and valve housing to the tank to a minimum during hot weather operation and also the necessity of maintaining the pressure of the fuel vaporized by heat action in the vaporizing chambers, to insure a proper mixing action with air by the fuel vapor projected from the discharge orifices, and further, to insure sufficient velocity of the air and fuel mixture into the burner, to carry the flame and heat into and through all parts of the burner, and from the burner in adequate amount to effect the desired results, for example, cooking operations.

These various requirements are adequately met by the stove of the invention, as follows:

First, the wicking 37 and 38 in the tubes 8 and 9 preferably comprises minute filaments of glass wool fiber packed so tightly into said tubes that the application of gas pressure into one end of either of said tubes produces no appreciable gas flow through the tube, and no appreciable drop in pressure at the pressure end of the tube; at the same time the nature of the glass wool fibers prevents their being deformed laterally by the high packing pressures used in filling the tubes, and as a result, because of the minute size of the filaments of the packing material, even more minute unobstructed and continuous passages remain from end to end of the packing material which operate effectively by capillary action to convey liquid fuel through the packing material nearly or quite to the vaporizing chambers, and the vast number of these passages delivers the fuel in that manner, to the said chambers in adequate amounts to sustain the operation of the burner; at the same time, the pressures developed in the vaporizing chambers, acting against the substantial friction of the liquid in the capillary passages, are insufficient to effect any appreciable fluid flow downwardly through the packing material.

Second, heat conduction from the burner 35 and valve housing 34, is reduced to a minimum, by making the tubes 8 and 9 with thin walls and of metal or metallic alloy that is highly resistant to heat conduction, for example, nickel silver or stainless steel. There are no metal or metallic alloy parts connected with the burner and valve housing excepting the tubes 8 and 9, and heat conduction from the burner and valve housing is thus reduced to a minimum.

Third, to avoid undue heat radiation from the burner 35 and valve housing 34, said parts are small and compactly arranged, the burner is circular and of small height, being about two and five-sixteenths inches in external diameter and one-half of an inch high, and the valve housing is located within the burner outline and has as its only projecting part, its lower projection closely connected with the upper ends of the tubes 8 and 9, the upper ends of said tubes being about three-sixteenths of an inch below the lower surface of the burner, whereby the only metal parts close enough to be noticeably affected by said radiation, are the upper end portions of the tubes 8 and 9, and that part of said radiation is advantageous rather than otherwise, in that it contributes heat to the vaporizing chambers.

Fourth, it is desirable to supply heat from the burner 35 to the vaporizing chambers 39 and 40 as effectively as possible and in sufficient amount to maintain said chambers hot enough to effectively vaporize the fuel at the lowest temperatures of use. This is accomplished with the stove of the invention, by making the valve housing 34 of metal or metallic alloy that is highly conductive and retentive of heat, for example, brass, and disposing the short bores therein for receiving the upper ends of the tubes 8 and 9, so closely to the portions of the housing connected with and directly receiving a high degree of heat from the burner, that the conduction paths in the material of the housing to the upper ends of said tubes are short, the upper ends of the tubes 8 and 9 being open, so that the upper walls of said vaporizing chambers are highly heated portions of the housing itself, said conductive effect being increased by extending the material of the housing around the upper ends of the tubes 8 and 9 in the form of substantial flanges extending vertically for the height of said chambers, thereby effectively and highly heating the upper ends and entire side walls of said chambers, the bottoms of said chambers being formed entirely by the upper ends of the wicking 37 and 38 in the tubes 8 and 9, so that the upper ends of said wicking are subjected directly to the high temperature produced in the vaporizing chambers, and effective vaporization of the fuel is the result.

The flame of the burner is circular in form, being limited by the outer and inner cylindrical walls 41 and 42 of the burner, which are highly heated by the flame; the inner cylindrical wall 42 is integral with the top wall of the burner, and said top wall rests directly on the valve housing 34 and is held in close contact therewith, said housing being disposed within said inner cylindrical wall 42 and spaced but a short distance therefrom; in this manner, the high heat developed in the burner is effectively communicated by conduction and radiation from the burner to the valve housing 34.

In the manner described, the stove of the invention provides the necessary conditions referred to, for sub-zero operation, and particularly for operation at very low temperatures of the atmosphere. Test stoves in accordance with the invention have been operated successfully and continuously over substantial time intervals with the temperature of the surrounding air 65 degrees below zero Fahrenheit, not only producing continuously the heat required to keep them in full operation, but at the same time delivering sufficient heat to utensils on the stove to effect successful cooking operations.

The burner of the invention includes a circular flame trough having a closed bottom wall 43 and open at its top, the outer and inner cylindrical walls 41 and 42 referred to being the outer and inner walls of the trough, as a result of which the flame and heat thereof are free to leave the top of the burner to engage cooking utensils supported above the burner, from which it appears that the major portion of the heat of the fuel is delivered for cooking and other useful purposes, and only a minor portion of said heat is required to maintain the burner in operation, even at very cold atmospheric temperatures.

The stove described, is provided with a torch 10 (Fig. 2), for preheating the burner, the upper ends of the generator tubes and the valve housing, when it is desired to start the operation of the stove. As shown in Fig. 7, the torch includes a stationary, vertical, metal sleeve 10 in which a wick tube 44 is mounted for a small amount of vertical movement. The tube 44 has a substantially smaller external diameter than the bore of the sleeve 10, to contain a helical compression spring 45 between the sleeve and tube. The tube 44 includes an upper portion in line with the space between the burner trough and the valve housing, with its upper end a small distance below the burner (Fig. 2), and a lower portion rigidly connected with said upper portion by a tubular connector 46 having an outer surface that is a sliding fit in the sleeve 10. The lower end portion of the sleeve 10 has extending through it, a fuel admission aperture 51. When the tube 44 is depressed a small distance against the action of the spring 45, the movement of the tube opens the aperture 51, and a free path is established for fuel flow through the aperture 51 into the tube. By holding the depressed condition of the tube 44 for a few seconds, a substantial amount of fuel flows into the wicking 53, then releasing the tube 44 positively moves the packing ring 50 against the lip 48 by the action of the spring 45. The torch with a definitely limited quantity of fuel therein is then lighted, the burner and valve housing are quickly heated to a high degree, and after a brief interval, opening the burner valve lights the burner, the operation of the torch continuing until stable operation of the burner is definitely established. If desired, the burner valve can be opened at the beginning of the preheating operation, thus making unnecessary any attention to the proper time of preheating.

Referring to Fig. 1, the valve housing 34 is of a type having short passages 54 and 55, directly from the vaporizing chambers 39 and 40 to a valve compartment in said housing, and having opposite and horizontally aligned discharge orifices 56 and 57 (Fig. 3), delivering the highly heated vaporized fuel in opposite directions into and through apertures 58 and 59 in the cylindrical inner wall 42 of the burner. In flowing from the orifices 56 and 57 across the space inside of the burner wall 42, which space at its lower end is open to atmosphere, the rapidly moving fuel vapor streams by aspiration, pick up and mix with highly heated air within the wall 42 in sufficient amount to support complete combustion of the fuel, and this fuel mixture when projected into the burner trough above described, through the apertures 58 and 59, burns in said trough with a blue flame having its base adjacent each of said apertures 58 and 59. The flames thus produced strike the outer cylindrical wall 41 of the burner trough and are directed thereby through the trough, and an annular blue flame is the result, extending substantially throughout the entire angular extent of the burner trough. As stated, the bottom of the burner trough is closed by an annular wall 43, which prevents flow of the flame downwardly from the trough, and the only path open for flow of the flame, is upwardly through the open upper end of the trough, against any cooking utensil that may be supported by the stand 23 in its operative position 32, above the burner. The action described is materially aided by providing the bottom wall 43 of the burner trough, below and in line with the apertures 58 and 59, with grooves 60 and 61, respectively (Figs. 3 and 1), extending radially entirely across the bottom wall 43 and tapering both in vertical depth and in width from a small amount adjacent the wall 41 to a width substantially equal to the width of the apertures 58 and 59 and a substantial depth adjacent and below the wall 42, so that the large inner ends of said grooves are in effect downward continuations of said apertures. This materially increases the quantity of mixed air and fuel vapor projected into opposite sides of the burner trough and correspondingly increases the flame produced in said trough. At the same time, because of the intimate association of the burner with the valve housing 34, and the location of said valve housing inside of the inner wall 42 of the trough of the burner, and because of the small size and compact relation of the parts, the valve housing 34 is so highly and effectively heated that the vaporizing action in the chambers 39 and 40 is efficiently maintained, with the result that air aspiration and mixing with the fuel vapor is correspondingly maintained, and the flame in the burner continues to burn effectively and efficiently, as long as there is sufficient fuel in the tank to maintain the requisite capillary action through the wicking 37 and 38 in the generator tubes 8 and 9.

In Fig. 8, the parts of a burner 35 of preferred construction, are shown in disassembled plan view to more clearly show their construction, said parts comprising a burner bowl 35a and a burner cap 35b which are separate from each other, to better facilitate constructing said parts as shown. The burner bowl 35a consists of a sheet metal stamping having an outer vertical, annular side wall 41a and a horizontal and annular bottom wall 43a to form portions of the burner trough above described. At the inner edge of said bottom wall 43a, the burner bowl is provided with an annular shoulder 43b formed by depressing the central portion of the burner bowl below the wall 43a. Inside of and spaced from the shoulder 43b, segmental openings 43c and 43d are formed through the central portion of the burner bowl, by arcuate cuts through the metal of the bowl, the portions so cut being bent downwardly along parallel fold lines to constitute parallel vertical flanges 43e and 43f spaced from each other a distance equal to the width of the lower portion of the valve housing engaging and supported by the upper end portions of the generator tubes 8 and 9; this leaves a flat bridge member 43g connecting opposite sides of the bottom wall 43a of the trough, which bridge member is positioned relatively to the burner bowl, to rest upon and closely engage the flat upper surface of said housing portion, with the burner bowl in proper position to cooperate with the fuel vapor discharge orifices in the manner above referred to. With the burner bowl in the position described, the flanges 43e and 43f rest firmly against the parallel, vertical sides of said housing portion, and are thus in close, heat conducting relation with the upper, vaporizing portions of the generator tubes 8 and 9. The bridge 43g thus constitutes a first heat conductive path that is short and effectively conducts the high degree of heat from the burner bowl 35a to the lower portion of the valve housing 34. The fuel valve is supported by a post 34a, which post is an integral part of the housing 34 and extends upwardly through a clearance aperture 43h in the bridge 43g. The wall 41a is provided with a suitable clearance slot 41b to clear the extension 65 from the valve casing. The bottom wall 43a of the burner bowl is provided with diametrically opposite grooves 60a and 61a in line with the fuel vapor discharge orifices in the valve structure.

The burner cap 35b shown in Fig. 8, consists of a sheet metal stamping having an outer, vertical, annular side wall 42a to form the inner vertical wall of the burner trough, the lower edge of which is a close fit against the shoulder 43b for support by an inwardly extending portion of the burner bowl 35a, outside of the openings 43c and 43d. The upper end of said wall 42a is integral with the top, generally circular and horizontal wall 35c of the burner cap, which top wall is imperforate excepting for a clearance aperture 35d for the screw 36 extending upwardly from the upper end of the post 34a. The wall 42a is provided with diametrically opposite openings 58a and 59a for alignment with the grooves 60a and 61a in the assembled burner, to afford unrestricted flow of the opposite streams of vaporized fuel mixture into the burner trough, and said wall 42a is also provided between said openings 58a and 59a, with a clearance slot 42b for the extension 65 of the valve structure. The top wall 35c is preferably provided with opposite and integral vanes 79a in line with the openings 58a and 59a, and extending from the level of said top wall outwardly and upwardly to adjacent the upper edge of the bowl wall 41a. Said vanes having widths somewhat greater than the width of the grooves 60a and 61a, and in the assembled burner said vanes are respectively above and in alignment with said grooves 60a and 61a, and serve to produce most effective flame distribution in the burner trough and most effective heat conduction to the burner cap and so to the post 34a of the valve housing 34. It will be understood, however, that the structure described is operative without the use of said vanes, which may be omitted for uses where maximum operating efficiency of the stove is not required. The burner cap 35c thus constitutes a second heat conductive path that is short and effectively conducts the high degree of heat from the wall 42a to the upper end of the post 34a and thus to the upper portion of the valve housing 34.

The burner parts described in connection with Fig. 8, are so proportioned that, when assembled as shown in Figs. 9 and 10, the bridge 43g rests firmly on the upper flat surface of the lower portion of the valve housing 34 with the flanges 43e and 43f pressing closely against the opposite flat side surfaces of said lower portion, that the lower edge of the wall 42a firmly engages the shoulder 43b and presses downwardly against the inner extension from the wall 43a of the burner bowl 35a, and that the top wall 35c of the burner cap 35b rests firmly on the upper flat end of the post 34a, in which position the burner parts are securely held by the nut on the screw 36 which presses downwardly on the top wall 35c of the burner cap 35b, the level of the said top wall 35c being enough lower than the upper edge of the side wall 41a to incline the vanes 79a upwardly to place the outer ends of said vanes substantially at the same elevation as said upper edge, as shown in Fig. 10.

Figure 3:
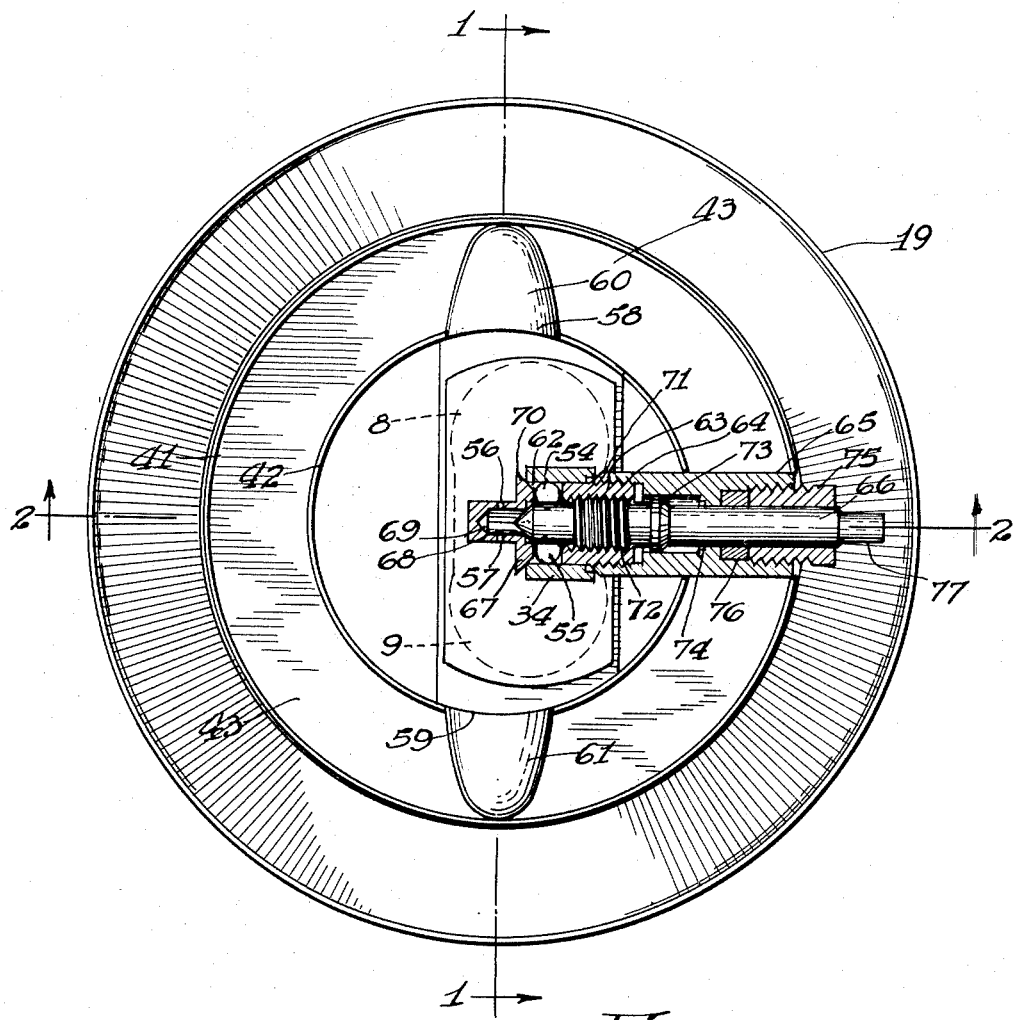
Fig. 3 is a horizontal sectional view to an enlarged scale of the structure shown in Figs. 1 and 2, taken along the line 3—3 in Fig. 2.

As shown in Fig. 3, the valve housing 34 is provided with a valve chamber 62 in a sleeve 63 tightly held in a bore in said housing by entering and having threaded engagement at 64 with internal threads in a tubular extension 65 containing and supporting a valve stem 66. The passages 54 and 55 from the vaporizing chambers 39 and 40 open into the valve chamber 62 which terminates in a shoulder portion 67 constituting a front valve seat 68 for engaging the tapered inner end of the valve stem to close the valve and prevent communication between said valve chamber and a small bore 69 from which the oppositely directed discharge orifices 56 and 57 extend. The sleeve 63 is provided at its outer end with a beveled flange 70 which by engaging the end of the bore in the housing 34, tightly presses said flange 70 and also a beveled shoulder 71 on the tubular extension 65, against the ends of the bore in the housing when the sleeve is tightly screwed into said tubular extension. The valve stem 66 is provided with external threads having engagement at 72 with internal threads in the sleeve 63 so that turning said stem moves the tapered end of said stem towards and from said front valve seat 68 as desired. The stem 66 is provided in a suitable bore therefor in the tubular extension 65, with a second valve member 73 for engagement with a back valve seat 74 when the tapered end of the valve stem is moved from engagement with the front valve seat 68 to establish free communication between the passages 54 and 55 and the discharge orifices 56 and 57, the engagement of said second valve member 73 with its back valve seat 74 preventing leakage of the fuel vapor around the stem 66 and from the valve housing 34. The outer portion of the tubular extension 65 is provided with a gland 75 around the stem 66 and threaded into said extension to engage packing material 76 around the stem to prevent leakage of fuel vapor from the valve housing 34 when the valve is closed. The outer end of the stem 66 is preferably flat-sided at 77 for engagement with an operating head, not shown, which may be removable.

As shown in Figs. 4 and 5, the effectiveness of operation of the valve mechanism and burner described is increased by providing an additional circular top plate 78 for the burner which is held tightly in engagement with the top of the burner by the nut on the stud 36, which plate 78 is of somewhat larger diameter than the burner wall 42 and is provided over the grooves 60 and 61 with inclined vanes 79 tending to hold the flame in the grooves and direct it angularly in the burner trough. The diameter of the plate 78 may be taken of a size to permit free vertical flow of any desired portion of the flame.

In the modified construction shown in Fig. 11, the general arrangement and operation are the same as above described, but with structural modifications to facilitate manufacture and to somewhat improve the operation of the stove. In this construction, the burner is of the form in general shown in Figs. 8, 9 and 10, with the addition of a burner cap bar giving the structure increased stability and improved operation; the control valve has the same operation as before, and includes structural changes facilitating the alignment of the fuel vapor discharge orifices with the burner parts, and simplifying the effectiveness of the valve action; the starting torch of the modified construction in addition to having the structure and operation above described, includes a device for dissipating any vapor pressure in the fuel tank at the beginning of the starting operation, and also supports the starting torch solely by the tank cap, with the operating handle of the torch below and protected by the catch pan of the stove; the modified construction also includes a windshield for the burner, supported by the catch pan, which in turn supports folding arms constituting a utensil support.

As indicated in Fig. 11, the tank cap 80 is rigidly secured to and supports the generator tubes, as shown for the tube 8, and said tubes are rigidly secured to and support the catch pan 81. The cap 80 constitutes a top wall element of the tank 82 and has threaded engagement with the upper portion of the tank 82 and carries a packing ring 83 to make a tight joint with said tank. The generator tubes are rigidly secured at their upper ends to and support the valve housing 84, which housing supports in the manner above described the burner bowl 41a, and said bowl in turn supports the burner cap 42a, the burner bowl and burner cap being held in place by a nut 85 on the threaded upper end of an orifice tube 86 projecting upwardly in the axis of the burner, from the housing 84.

As shown in Fig. 11, the outer stationary sleeve of the starting torch comprises two coaxial parts 87 and 88 which are screwed together, the upper one of said parts, 87, extending through and being rigidly secured to the tank cap 80, and terminating a short distance below the catch pan 81. The wick tube 89 of the torch extends substantially above the upper end of the sleeve part 87 and through a clearance opening 90 therefor in the catch pan 81, terminating just above said catch pan. About midway between the catch pan 81 and the upper end of the sleeve part 87, the wick tube 89 has rigidly secured thereto an operating handle 91 extending outwardly radially from the wick tube for convenient engagement by the operator of the stove. The catch pan 81 has rigidly secured thereto and projecting upwardly therefrom around the opening 90, a semi-cylindrical wind guard 92 to protect the flame of the torch and the hand of the operator, during the operation of the torch.

As also shown in Fig. 11, the catch pan 81 supports and has rigidly secured thereto, the lower cylindrical portion 93 of a windshield, which includes an upper and similar cylindrical portion 94 of somewhat larger diameter than the portion 93 and extending around and spaced from the burner, and from just above the top of the burner to somewhat below the upper edge of the lower portion 93. Spaced studs 95 rigidly connect the lower part of the portion 94 with the upper part of the portion 93 to support said portion 94, thereby providing an annular air admission opening between said portions 93 and 94 and around the upper edge of the portion 93, to supply the air that may be required to burn the fuel vapor delivered by diametrically opposite orifices 96 in the orifice tube 86.

The upper end of the shield portion 94 is provided with an outwardly extending annular flange 97 supporting and rigidly secured to equally spaced U-shaped brackets 98 having pivot rods 99, each of which pivotally supports a utensil supporting arm 100 having a position when not in use folded against the top of the burner and a position in use extending radially and substantially outside of the burner, but one of said arms 100 being shown in Fig. 11. The end wall of the casing 19 is preferably provided with stamped lugs 101 to rest against the arms 100 in their folded condition, to snugly hold said arms against the burner.

As shown in Fig. 12, the valve housing 84 is provided with a valve chamber 102 containing a horizontally movable valve member 103 having opposed end valve surfaces for respectively engaging front and back valve seats 104 and 105 to control flow of fuel vapor to said valve chamber and to prevent leakage around the stem of the valve when the stove is in operation. The valve chamber 102 is in communication with a short supply passage 106 in turn communicating with a passage 107 extending in the valve housing above the generator tubes 8 and 9, said passage 107, as shown in Fig. 13, being in communication with short vertical passages 108 opening into the vaporizing chambers in the upper ends of said generator tubes. As a result, when the valve member 103 is moved away from its seat 104, free flow of fuel vapor is permitted into the valve chamber 102 to operate the stove, and when the valve member 103 is tightly pressed against said seat 104, flow of fuel vapor into the valve chamber 102 is prevented. With the valve member 103 moved away from its seat 104 in its stove-operating position, and with the valve member 103 then tightly pressed against the back valve seat 105, vapor flow from the valve chamber 102, excepting into the orifice tube 86, cannot occur and leakage around the valve stem is prevented. The valve chamber 102 is preferably cylindrical and coaxial with the valve member 103 which is also cylindrical and of substantially smaller diameter than said valve chamber. The valve chamber is continued by a bore of the same diameter away from the valve seat 104 through the valve housing 84, and the outer portion of said bore is threaded to engage corresponding external threads on the inner end portion of a plug 109, which plug has the valve seat 105 formed on its inner end. The plug 109 is provided with a coaxial and internally threaded bore, which threaded bore engages corresponding external threads on a valve stem 110 on the inner end of which the valve member 103 is coaxially and rigidly mounted. The outer end of the plug 109 is provided with a counterbore 111 of substantially larger diameter than the stem 110, and having a smooth inner surface that is a snug sliding fit on the smooth cylindrical outer surface of the hub of a protective member 112. The stem threads continue only part of the length of the hub of the member 112, said hub having a bore fitting said stem and having internal threads for only a part of its length, fitting said stem threads. A removable handle 113 is mounted on the outer end of the stem 110 to operate the latter. The member 112 is screwed to tightly bottom on the stem threads, so that said member moves with the stem 110 when the latter is operated. It has been found in practice, to be difficult to find any gland packing material for the stem 110, that will continue its effectiveness at the high temperatures to which the valve housing is heated; as a result, no packing material is used in the counterbore 111, and the member 112 is provided at its outer end, with a conical flange 114 extending towards the plug 109. It has been found that although there is no leakage around the stem 110 for the open position of the valve member 103 tightly pressed against the back seat 105, during the short time interval between the movement of the valve member away from its front seat 104 starting the admission of fuel vapor into the valve chamber 102, and until said valve member is pressed tightly against its back seat 105, a small amount of said fuel vapor may seep between the plug 109 and the outer surface of the member 112 and be ignited by the heat of the burner; the conical flange 114 is in the path of any such flame and protects the hand of the operator against being burned.

In practice it has been found that accurately aligning the orifices 96 angularly, with the flame openings in the burner cap 42a, is a difficult and time-consuming assembling operation because of the relatively small diameter of the orifice tube 86, unless means are provided to effect such alignment. To secure this result, the valve housing 84 is provided with an upwardly projecting extension 115 coaxial with the vertical walls of the burner bowl 41a and cap 42a of the burner, to support the orifice tube 86 also coaxially with said burner walls. The lower end of the orifice tube is provided with a flat sided flange 116, which to cheapen and facilitate construction may, for example, be hexagonal, although other flat sided forms may be employed if preferred. The extension 115 is provided with a bore communicating with the valve chamber 102, which bore is enlarged at its upper portion and finished by a broaching operation to produce a flat sided seat 117 for the flange 116, of the same form as and closely fitting said flange and at the same time supporting the orifice tube vertically to establish vertical alignment of the axes of the orifices 96 with the flame openings in the vertical wall of the burner cap 42a. The extension 115 is externally threaded and engaged by a threaded collar 118 extending over the flange 116, so that tightly screwing said collar on said extension, securely holds the flange 116 in place in said broached opening, with the axes of the orifices 96 in angular alignment with the flame openings in the burner cap 42a, the flat side or sides of the broached opening and of the flange 116 being so related angularly to the orifices 96 as to secure this result.

With the construction just described, all the assembler is required to do, is to place the flat-sided flange 116 in the broached opening 117 in the extension 115, and then apply and tighten the collar 118. Where, for reasons of economy in manufacture, it is desired to use rods of standard shapes in making the orifice tube 86, for example hexagonal rods, the assembler may be required to select one of several possible angular positions of the orifice tube, before inserting the flange 116 in the broached opening 117; but this adds no appreciable cost to the assembling because, for example with a hexagonal flange 116, in either improper angular position of the flange 116 in the broached opening, the opposite orifices 96 will be 60 degrees out of angular alignment, which amount of angular difference is readily observable and will be avoided by the assembler. With the flat surfaced flange 116 in its intended angular position in the broached opening, which in any event requires no great effort on the part of the assembler, the latter is entirely relieved of any further thought whatever, as to the accurate and minute angular relationship of the orifices 96 to the valve housing 84, since this is effectively taken care of by the flange and broached opening structure described. It has been found desirable to place filtering material 119, for example, loosely associated asbestos fibres, in the extension 115 at and in the lower portion of the tube 86, to trap particles of mineral matter that might clog the orifices 96.

As shown in Fig. 12, the lower end of the nut 85 is of reduced diameter and shouldered to extend loosely through a central aperture in a cap bar 120 of conductive metal, for example brass, extending as more clearly shown in Fig. 17, diametrically across the lower surface of the top wall of the burner cap 42a, to which said bar is rigidly secured, for example, by silver soldering. The lower end of the nut 85 is counterbored to form a relatively thin wall extending through the bar 120, and the lower end of said thin wall is riveted or spun outwardly to loosely hold the nut in the bar and prevent its loss, when the nut and burner are removed from the upper end of the orifice tube 86. As shown in Fig. 17, the bar 120 is arcuate in form, being substantially horizontal at its mid-portion and continuing outwardly and upwardly at its ends and extending nearly across and over the trough of the burner. The end portions of the bar 120 extend through the flame openings 58 and 59 in the vertical side wall of the burner cap 42a, said bar having a width substantially equal to the width of said flame openings. As a pre-assembly operation, the burner cap 42a with the bar 120 attached thereto as described, is rigidly secured to the burner bowl 41a with the flame openings 58 and 59 in alignment with the flame grooves 60 and 61 in the bottom wall of the burner bowl 41a. Where any of the parts of the stove are described as rigidly secured together, unless otherwise specified, it will be understood that they may be connected by silver soldering or any equivalent means. The burner thus assembled, is ready for mounting as a unit on the valve housing 84, in connection with assembling the stove as a whole. In so doing, the flanges 43e and 43f extending downwardly from the burner bowl 41a, engage the parallel sides of the valve housing 84 (Fig. 14), preferably locating the centers of the flame openings 58 and 59 in a vertical plane through the axes of the generator tubes 8 and 9. With this position of the burner relatively to the valve housing 84, the flat sided flange 116 and flat sided seat 117 therefore above described, are so disposed angularly of the valve housing 84, that the common axis of the orifices 96 lies in the same vertical plane through the axes of the generator tubes, thereby establishing an angularly aligned condition of the orifices 96 with the flame openings 58 and 59 and with the flame grooves 60 and 61. This results in the vapor from the orifices 96 and the resulting flames inside of the vertical wall of the burner cap 42a, indicated in broken lines in Fig. 17, being directly above the portions of the valve housing 84 closing the upper ends of the generator tubes 8 and 9, which most effectively communicates the heat radiated downwardly from said flames, directly to the portions of the valve housing that are most desired to be heated; at the same time, the bar 120 stiffens the cap 42a and restrains the vapor streams and flames against free expansion upwardly, thereby more effectively delivering the flames into the burner trough, than if the flames were not so restrained.

With the exception of the added burner cap bar 120, and somewhat lengthening the flanges 43e and 43f to raise the burner to the level of the axis of the orifices 96 as required by Figs. 11, 12 and 17, the burner of the latter figures has substantially the same construction and operation as described in connection with Figs. 8, 9 and 10.

As shown in Fig. 16, the pivot rods 99 of the brackets 98 are inclined to the radii of the flange 97 extending through them, and they are also inclined to the longitudinal axes of the utensil arms 100 supported by them, the effect of said inclinations being to place the longitudinal axes of said arms substantially in said radii for the open position of said arms as shown for one of said arms in Fig. 16, and also being to so incline said arms in their folded condition resting on the flange 97, that they clear the brackets 98 and each other, and at the same time that they extend at their outer ends to the outer edge of the flange 97, as shown for two of said arms in Fig. 16, there being three equally spaced utensil arms 100 shown in said figure. In this manner, the maximum possible length of radial utensil arms in use is secured, that can be had without interference of said arms in their folded condition with their supporting brackets and with each other, while at the same time keeping said arms in their folded condition, within the outer edge of the flange 97.

If preferred, the catch pan 81, the windshield portions 93 and 94 and the flange 97 may be made in the form of a unitary and integral sheet metal stamping, as illustrated in Fig. 15. As there shown, the structure includes a horizontal and circular bottom wall 132, having an upturned outer edge and functioning in every particular as does the catch pan 81 shown in Fig. 11; from the outer edge of said upturned portion, an integral cylindrical portion 133 extends upwardly; from the upper edge of the portion 133, an integral conical portion 134 extends upwardly with an outward flare to increase the diameter of the structure; from the outer and upper edge of the portion 134, an integral cylindrical portion 135 extends upwardly to surround the burner in spaced relation, and from the upper edge of the portion 135, an integral flange portion 136 extends upwardly and outwardly, having the same form and purpose as the flange 97 shown in Fig. 11. The bottom wall 132 is flanged to receive and be rigidly secured to the generator tubes, as shown for the generator tube 8 in Fig. 18, and is also provided with an opening 139 corresponding to the opening 90 in the catch pan 81 and for the same purpose. One side of the cylindrical portion 133 and the lower part of the same side wall of the conical portion 134 are provided with a large opening 137 to clear the valve housing 84 of the stove and to admit air required to burn the fuel. If additional air is required for the fuel, or more direct supply of said air to parts of the burner flames is desired, the cylindrical portion 133 may be provided with air admission openings 138 of the size required and distributed as desired, which openings 138 are preferably shielded as indicated in Fig. 15, for example, by bending protective vanes inwardly in making said openings.

While I have shown my invention in the particular embodiments above described, I do not limit myself thereto as I may employ equivalents thereof without departing from the scope of the appended claims.

I claim:

1. In a portable stove for burning liquid fuel, the combination comprising a fuel tank having means thereon defining a top wall element thereof, a vertical generator tube secured to said top wall element and extending therethrough into said tank, wick material extending from within said tank into said generator tube and part way upwardly therein, said generator tube defining a vaporizing chamber therein above said wick material, a valve housing mounted on the upper end of said generator tube and closing the upper end of said vaporizing chamber, said valve housing having means thereon defining a pair of generally horizontal fuel discharge orifices directed outwardly thereof in substantially opposite directions, said valve housing having means defining a passage affording communication through said housing between said vaporizing chamber and said orifices, said valve housing comprising manually movable valve means for selectively shutting off said passage and thereby cutting off communication between said vaporizing chamber and said orifices, means defining an annular open-topped flame trough having a bottom wall element and radially spaced inner and outer side wall elements, said side wall elements of said trough defining an annular top opening therein overlying said bottom wall element, generally circular top wall means integral with and extending across the upper margin of said inner wall element of said trough, means forming a heat-conductive conection between said circular top wall means and said valve housing, said inner side wall being spaced substantially outwardly from said valve housing, said inner wall element having a pair of entrance openings therein generally at diametrically opposite points thereon for admitting a mixture of fuel and air to said trough, means mounting said trough on said stove with said entrance openings substantially alined with said discharge orifices and with substantial clear space therebetween so that said discharge orifices will direct fuel vapor across said space and into said entrance openings for combustion in said trough, said bottom wall element of said trough having a pair of grooves therein alined with and adjacent said entrance openings and sloping downwardly between said outer and inner wall elements for deflecting fuel vapor and air upwardly into said trough, means defining a pair of generally horizontal vanes extending outwardly from the upper margin of said inner wall element toward said outer wall element and substantially in overlying relation to said grooves and said entrance openings for restraining upward escape of fuel vapor from said trough, and means mounted on said stove and defining an annular generally cylindrical windshield disposed around said trough in outwardly spaced relation thereto.

2. In a portable stove for burning liquid fuel, the combination comprising a fuel tank having means thereon defining a top wall element thereof, a vertical generator tube secured to said top wall element and extending therethrough into said tank, wick material extending from within said tank into said generator tube and part way upwardly therein, said generator tube defining a vaporizing chamber therein above said wick material, a valve housing mounted on the upper end of said generator tube and closing the upper end of said vaporizing chamber, said valve housing having means thereon defining a pair of generally horizontal fuel discharge orifices directed outwardly thereof in substantially opposite directions, said valve housing having means defining a passage affording communication through said housing between said vaporizing chamber and said orifices, said valve housing comprising manually movable valve means for selectively shutting off said passage and thereby cutting off communication between said vaporizing chamber and said orifices, means defining an annular open-topped flame trough having a bottom wall element and annular radially spaced inner and outer side wall elements, said side wall elements of said trough defining an annular top opening therein overlying said bottom wall element, generally circular top wall means extending across the upper margin of said inner wall element of said trough, said inner side wall being spaced substantially outwardly from said valve housing, said inner wall element having a pair of entrance openings therein generally at diametrically opposite points thereon for admitting a mixture of fuel and air to said trough, means mounting said trough on said stove with said entrance openings substantially alined with said discharge orifices and with substantial clear space therebetween so that said discharge orifices will direct fuel vapor across said space and into said entrance openings for combustion in said trough, said bottom wall element of said trough having a pair of grooves therein alined with and adjacent said entrance openings and sloping downwardly between said outer and inner wall elements for deflecting fuel vapor and air upwardly into said trough, and means defining a pair of generally horizontal vanes extending outwardly from the upper margin of said inner wall element toward said outer wall element and substantially in overlying relation to said grooves and said entrance openings for restraining upward escape of fuel vapor from said trough.

References Cited in the file of this patent

UNITED STATES PATENTS

| Number | Name | Date |
|---|---|---|
| 22,189 | Mills | Nov. 20, 1858 |
| 185,065 | Bean | Dec. 5, 1876 |
| 497,760 | Betts | May 23, 1893 |
| 521,748 | Wilder | June 19, 1894 |
| 524,526 | Geiser | Aug. 14, 1894 |
| 724,543 | Chapman | Apr. 7, 1903 |
| 799,581 | Trewhella | Sept. 12, 1905 |
| 902,894 | Matthews | Nov. 3, 1908 |
| 938,080 | Schreidt | Oct. 26, 1909 |
| 950,997 | Chapman | Mar. 1, 1910 |
| 987,050 | Curtin | Mar. 14, 1911 |
| 1,062,886 | Carlson | May 27, 1913 |
| 1,277,872 | Crane | Sept. 3, 1918 |
| 1,380,527 | Carr | June 7, 1921 |
| 1,433,632 | Lucas | Oct. 31, 1922 |
| 1,920,933 | Hoff | Aug. 1, 1933 |
| 2,097,771 | Nelson | Nov. 2, 1937 |
| 2,139,819 | Graetz | Dec. 13, 1938 |
| 2,219,414 | Ekstrom | Oct. 29, 1940 |
| 2,381,906 | Howard | Aug. 14, 1945 |
| 2,469,185 | Tullis | May 3, 1949 |
| 2,478,364 | Bramming | Aug. 9, 1949 |
| 2,482,797 | Quinnell | Sept. 27, 1949 |
| 2,538,538 | Stemple | Jan. 16, 1951 |

FOREIGN PATENTS

| Number | Country | Date |
|---|---|---|
| 317,671 | France | Aug. 5, 1902 |
| 866,033 | France | Mar. 24, 1941 |